United States Patent

[11] 3,583,301

| [72] | Inventor | Richard R. Wareham<br>Marblehead, Mass. |
|---|---|---|
| [21] | Appl. No. | 762,281 |
| [22] | Filed | Sept. 16, 1968 |
| [45] | Patented | June 8, 1971 |
| [73] | Assignee | Polaroid Corporation<br>Cambridge, Mass. |

[54] PHOTOGRAPHIC APPARATUS
14 Claims, 2 Drawing Figs.

| [52] | U.S. Cl. | 95/11, 240/37.1 |
|---|---|---|
| [51] | Int. Cl. | G03b 19/00 |
| [50] | Field of Search | 95/11, 11.5; 240/1.3, 37, 37.1 |

[56] References Cited
UNITED STATES PATENTS

| 1,700,226 | 1/1929 | House | 240/37.1 |
|---|---|---|---|
| 3,312,086 | 4/1967 | Casebeer et al. | 240/1.3X |
| 3,458,270 | 7/1969 | Ganser et al. | 240/1.3X |

FOREIGN PATENTS

| 1,192,047 | 4/1965 | Germany | 240/1.3 |
|---|---|---|---|

*Primary Examiner*—John M. Horan
*Assistant Examiner*—Fred L. Braun
*Attorneys*—Brown and Mikulka, William D. Roberson and James L. Neal

ABSTRACT: Apparatus supporting a multilamp photoflash assembly responsive to a thermal discharge of one lamp of the assembly for selecting another lamp for subsequent ignition. A bimetallic element functions as part of an escapement mechanism incorporating two movements of a bimetallic element thereby indexing a multilamp photoflash assembly.

INVENTOR.
Richard R. Wireham
BY
Brown and Mikulka
and
James L. Neal
ATTORNEYS

PHOTOGRAPHIC APPARATUS

SUMMARY OF THE INVENTION

This invention involves apparatus for discharging photoflash lamps in timed relationship with exposure producing operation of a photographic camera. The apparatus is responsive to thermal radiation resulting from discharge of one lamp for automatically selecting another lamp for subsequent discharge. In a preferred embodiment, the apparatus is mounted on a photographic camera and operable to connect lamps of a multilamp assembly in a flash lamp ignition circuit and discharge them one at a time in succession. A lamp connected in the circuit is discharged in timed relationship to exposure producing operation of the camera. In response to discharge of the lamp, the apparatus of this invention operates to connect another lamp in the circuit for ignition.

It is an object of this invention to provide inexpensive and uncomplicated apparatus for discharging photoflash lamps of a multilamp photoflash assembly one at a time in succession, in response to successive exposure producing operations of a photographic camera.

It is another object of this invention to provide apparatus responsive to discharge of one lamp of a multilamp photoflash assembly for selecting another lamp of the assembly for ignition.

DETAILED DESCRIPTION OF THE DRAWINGS

Figure 1:
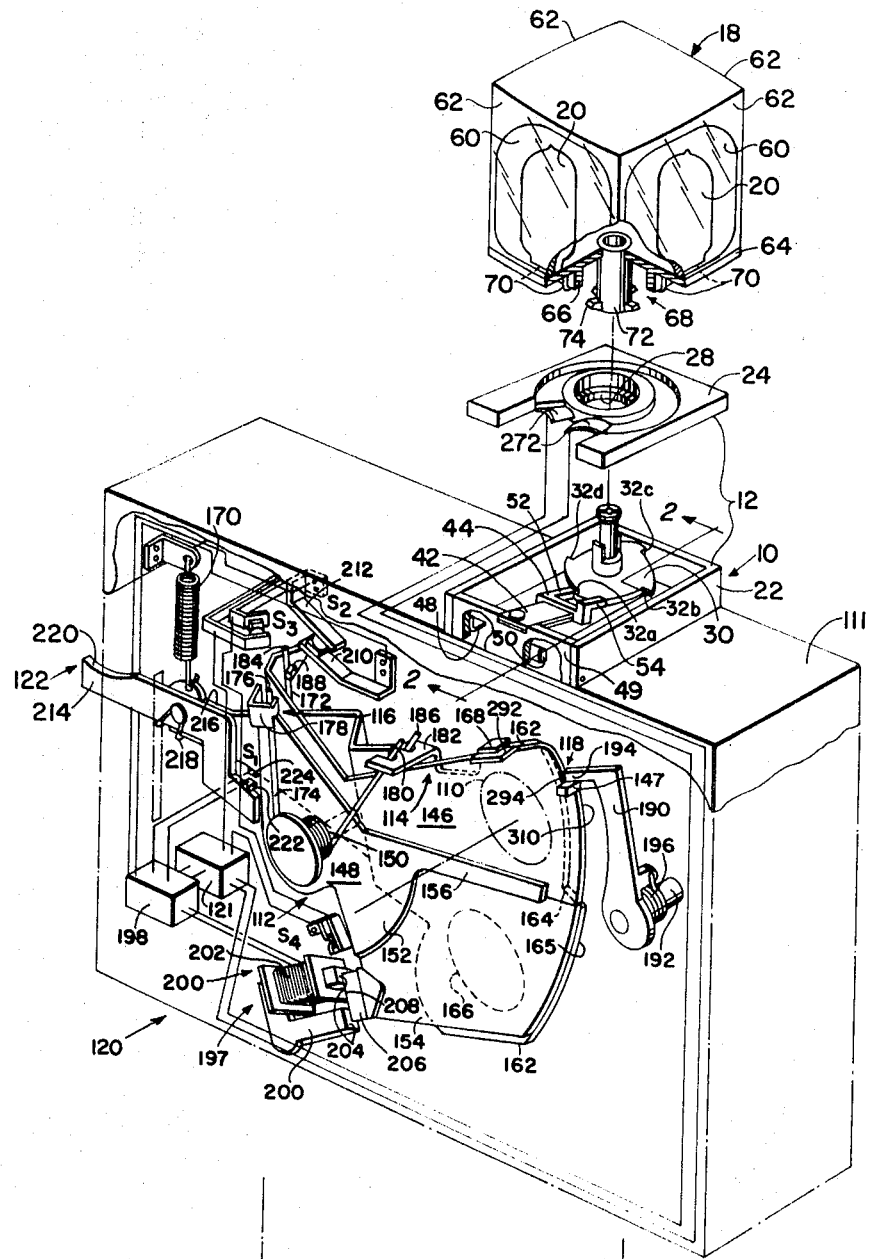
FIG. 1 is a partially broken away perspective view of a preferred embodiment of this invention.
Figure 2:
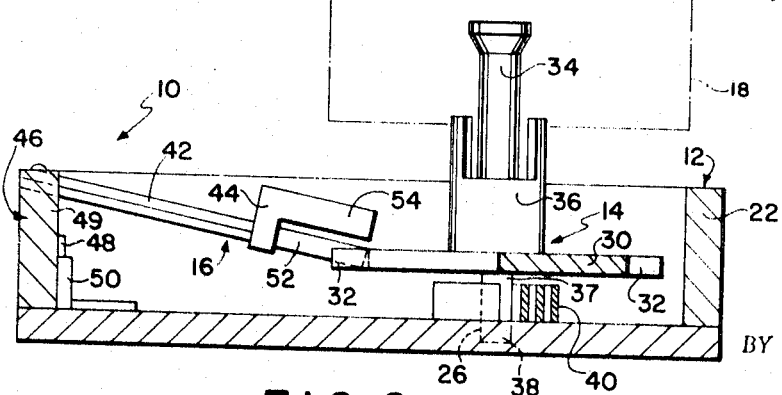
FIG. 2 is a cross-sectional view along line 2—2 showing a portion of the apparatus illustrated in FIG. 1.

A preferred embodiment of the invention will be described in connection with FIGS. 1 and 2.

Flash lamp selection apparatus 10 comprises housing means 12, rotatable means 14 and thermal radiation responsive means 16. The apparatus detachable supports multilamp photoflash assembly 18 including lamps 20.

Housing 12 includes support 22 and cover 24. The support defines journal bearing 26 providing one support for rotatable means 14. The cover defines journal bearing 28 providing another support for rotatable means 14 and means supporting a pair of electrical terminals.

Rotatable means 14 comprises wheel 30 having a number of teeth 32, the number of teeth corresponding to the number of lamps in multilamp assembly 18 and arranged at equiangular intervals around the periphery of the wheel; mounting means 34 for detachably supporting a multilamp photoflash assembly 18; journal 36 and shaft 37 forming journal 38 at one end. Rotatable means 14 is supported by the journal bearings in support 22 and cover 24 for controlled rotation. Coiled drive spring 40 constantly biases rotatable means 14 for clockwise rotation. The drive spring is attached at one end to shaft 37; its length is coiled about the shaft and its other end is fastened to support 22. Mounting means 34 may be of any desired type, one suitable mounting means is described in U.S. Pat. application Ser. No. 743,744 entitled, "Photographic Flash Assembly" and filed July 10, 1968, now abandoned, in the name of David E. Van Allen.

Thermal radiation responsive means 16 comprises bimetallic member 42, regulating structure 44 including pawls 52 and 54, and release means 46. Release means 46 is pivotally mounted to support 22 and biased for clockwise rotation by spring means 48. Stop 50 limits clockwise rotation of the panel 49 means so that bimetallic member 42 extends from a position above wheel 30, angularly downward toward and to a peripheral portion of the wheel. The bimetallic member supports regulating structure 44 adjacent the aforesaid peripheral portion of wheel 30. Pawls 52 and 54 cooperate with the teeth on the wheel to control rotation of the wheel. Second pawl 54 is displaced laterally from and above pawl 52. In this manner, when pawl 52 is located in the path of teeth 32, in holding engagement with one tooth for preventing rotation of wheel 30, pawl 54 is positioned between the tooth held by pawl 52 and the adjacent tooth next to be engaged by pawl 52. Pawl 54 is then positioned above the path of teeth 32. Bimetallic member 42 is movable between a deflected and nondeflected position. In its nondeflected position, regulating structure 44 is located in the holding position described above. The bimetallic member deflects in response to thermal radiation resulting from discharge of a photoflash lamp, and the resulting operation will subsequently be described.

Release means 46 is pivotal counterclockwise to engage regulating structure 44 form the teeth of wheel 30 to thereby permit drive spring 40 to be wound by manual counterclockwise rotation of rotatable means 14.

Multilamp photoflash assembly 18 comprises a generally cubic housing supporting a photoflash lamp 20 and an individual reflector 60 in each of four peripheral faces designated by numeral 62. The unit is provided with support 64 defining contact supporting ring 66 and connecting portion 68. The contact ring locates lead-in wires 70 from each lamp for selective contact with the pair of terminals supported by cover 24 for including the terminals in a flash lamp ignition circuit within the photographic camera, as will hereafter be described. The connecting portion includes hollow post 72 and four radial outwardly extending lugs 74 spaced uniformly about the outward extremity of the post. Post 72 and lugs 74 cooperate with mounting means 34 as described in the aforementioned David E. Van Allen patent application.

Photographic exposure control apparatus usable with the flash lamp selecting apparatus of this invention includes means 110 supported by housing 111 and defining and exposure aperture, shutter 112, control means 114, drive means 116, latch means 118, retaining means 120, photoflash lamp ignition circuit 121 and operating means 122.

Shutter 112 includes opening blade means 146 and closing blade means 148, each pivotally mounted upon hub 150 for aperture blocking and unblocking movement. The closing blade means includes support portion 152 and blade portion 154. The support portion is pivotally mounted upon hub 150 in overlying relationship to opening blade means 146. Blade portion 154 is mounted upon support portion 152 so that it lies in coplanar relationship with blade 146. In the position of FIG. 1, an edge of blade portion 156 of support 152 abuts an edge of blade 146. Elongated portion 156 of support 152 forms a light seal along the abutting edges.

Control means 114 comprises a capping blade 162 pivotally mounted upon hub 150 for movement between first and second positions. The capping blade forms cam 164 and aperture 166 and supports abutment 168. The abutment extends into the path of movement of the opening blade means and, due to the abutting relationship of the opening and closing blades, limits counterclockwise movement of both the opening and closing blades. Spring 170 continuously biases the capping blade in a clockwise direction toward its first portion. When the capping blade is moved toward its first position, abutment 168 engages opening blade 146 and urges the opening blade and closing blade 148 clockwise toward their respective aperture blocking and unblocking positions. Retaining means 120 is positioned adjacent the aperture unblocking position of closing blade 148 for limiting clockwise motion. Since spring 170 continuously biases the control means in the clockwise direction, blade 148 is continuously and firmly pressed against the retaining means, for reasons which will hereafter be described.

Drive means 116 includes drive springs 172 and 174 for blade 146 and blade 148, respectively. Spring 174 is coiled about hub 150 and includes end portion 176 which extends outwardly form hub 150 and engages closing blade 148 at 178 and end portion 180 which extends outwardly form the hub and engages control means 114 at 182. Similarly, spring 172 is coiled about the hub and includes end portions 184 and 186 which extend outwardly form the hub and engage opening blade 146 at 188 and control means 114 at 182, respectively. Drive spring 172 is preloaded to bias the opening blade for counterclockwise rotation about the hub while biasing the opening blade against the abutment 168 of the capping blade. Similarly, spring 174 is preloaded to bias the closing blade for counterclockwise rotation about the hub while biasing the capping blade for clockwise rotation so that the closing blade is biased against the opening blade. All three of the above-described blades may be moved together, as a unit, without influencing the condition of drive springs 172 and 174; the condition of the drive springs being affected only when there is relative motion between the blades. The preloaded condition of the springs serves to maintain the elements in their proper relative positions when the apparatus is in the rest position.

Latch means 118 releasably holds opening blade 146 in its aperture blocking position against the bias of spring 172. It includes arm 190 pivotally mounted upon pin 192, projection 194 extending from the end of arm 190 for releasably engaging an offset portion 147 of opening blade 146 and spring 196 for exerting a counterclockwise bias upon arm 190.

Retaining means 120 may comprise, for example, electrical control circuit means 198, electromechanical holding device 197 and switches $S_1$ and $S_2$.

One example of a control circuit suitable for use with retaining means 120 is disclosed in U.S. Pat. No. 3,326,103 which was issued to J. M. Topaz on June 20, 1967. The circuit includes a photoresponsive element, such as a cadmium sulfide photoconductor, arranged to receive light from the scene being photographed and having a resistance which is functionally related to the intensity of scene light. The timing operation of the circuit is responsive to the resistance value of the photoresponsive element.

The electromagnet including U-shaped core 200 and electrically energizable coil 202 wound around one leg of the core, coil 202 being included in circuit 198. The free ends, 204, of the core are coplanar and cooperable with magnetizable keeper 206 mounted upon closing blade means 148. The core of the electromagnet is positioned adjacent the aperture unblocking position of the closing blade means for contact with the keeper when the closing blade is in the aforesaid aperture unblocking position, the core and keeper being so arranged that surface 208 of the keeper contacts surfaces 204 of the U-shaped core to define a magnetic circuit. When the electromagnet is energized, a sufficient magnetomotive force is applied to the magnetic circuit to hold the keeper against the core and thus retain the closing blade in aperture unblocking position.

Switch $S_1$ is normally open and is closed by initial operation of operator means 122 to energize the timing circuit means. Switch $S_2$ may include poles 210 and 212 wherein pole 210 is normally biased out of contact with pole 212 and adapted to be thrown into contact therewith when opening blade means 146 is in its initial position. Switch $S_2$ is operative in conjunction with timing circuit means 198 and coil 202 included therein for controlling exposure interval duration.

Photoflash lamp ignition circuit 121 is provided and may be associated with control circuit 198. Circuit 121 incorporates, in a series, a pair of terminals 272; a flash ignition switch $S_3$ which when closed completes circuit 121 for igniting a flash lamp; and switch $S_4$ for opening circuit 121 while switch $S_3$ is closed. Switch $S_3$ is biased open and positioned to be closed by aperture unblocking movement of opening blade means 146. Switch $S_4$ is biased open and held closed by closing blade means 148 when the closing blade means is in its aperture unblocking position. When the closing blade means begins to move toward its aperture blocking position, switch $S_4$ opens according to its bias to open circuit 121.

Operator 122 includes actuator lever 214 pivotally mounted to extension 216 of capping blade 162 and biased for counterclockwise movement about the pivotal mount by spring means 218. End 220 of lever 214 extends through a slot in a side of housing 111 for manual engagement. Terminals 222 and 224 of switch $S_1$ are mounted, respectively, upon actuator 214 and extension 216 for contact in response to initial movement of the actuator. Spring means 218 is substantially weaker than spring 170. Thereby, manual pressure applied to end 220 of lever 214 will first close switch $S_1$ and then impart movement to capping blade 162.

Operation of the above-described preferred embodiment of this invention will now be described.

To initiate operation, assembly 18 is inserted into the socket means. Pawl 49 is pivoted counterclockwise against the bias of spring means 48 to remove regulating structure 44 from engagement with teeth 32 to thereby enable rotatable means 14 to be turned counterclockwise. The assembly is then manually grasped and rotated counterclockwise to similarly rotate means 14 and tension drive spring 40. The rotation occurs until spring 40 is tightly wound. The assembly is released and rotatable means 14 is advanced clockwise a fractional turn until a tooth 32 abuts pawl 52. (In FIG. 1, tooth 32a is retained by pawl 52.) The rotational orientation of assembly 10 established by mounting means 34 directs one of the lamps 20 toward the scene to be photographed when a tooth 32 abuts pawl 52.

To produce a photographic exposure, lever 214 is displaced downwardly to initiate exposure producing operation of the apparatus. Downward movement of the lever first closes switch $S_1$. Closure of switch $S_1$ energizes timing circuit 198 and coil 202 of an electromechanical holding device 197 to prevent forward movement of closing blade means 148 according to the bias of its drive spring, which movement would otherwise occur upon the subsequent movement of blade 146. Energization of the coil provides, in the magnetic circuit of core 200 and keeper 206, a magnetic induction sufficiently large to create a force on the keeper for holding the closing blade in its initial position against the bias of its drive spring independently of movement of opening blade 146.

Further downward movement of the lever effects counterclockwise movement of control means 114 from its first position toward its second position, against the bias of spring 170. Movement of the control means removes abutment means 168 from engagement with surface 292 of the opening blade. The opening blade moves slightly within its aperture blocking position to close gap 294 existing due to the previous retention of blade 146 by abutment means 168 and is releasably held in aperture blocking position by latch means 118.

Counterclockwise movement of control means 114, while movement of the opening and closing blades are arrested, "winds" drive springs 172 and 174 to store a predetermined amount of energy therein in addition to the energy stored therein due to the preloaded condition. Control means 114 ultimately reaches a position wherein cam surface 164 engages projection 194 of latch means 118. A further increment of movement carries the control means to its second position wherein it lies in unblocking relationship with the exposure aperture. The aforesaid further increment of movement causes cam surface 164 to move projection 194 clockwise, off opening blade 146, to release the opening blade for movement. Projection 194 continues to ride upon raised surface 165 of cam 164 and thereby prevents return movement of the latch under the influence of biasing spring 196.

The opening blade moves toward and to its aperture unblocking position, under the influence of drive spring 172, to initiate an exposure interval. During its movement, the opening blade opens switch $S_2$ to activate circuit means 198 to initiate the timing operation and then closes switch $S_3$ to complete the photoflash lamp ignition circuit, switch $S_4$ being held closed by blade 148. The single lamp connected in circuit 121 by wires 70 and terminals 272 is ignited when switch $S_3$ is closed, ignition taking place in a predetermined timed relationship to the aforesaid aperture unblocking movement of the opening blade.

The timing operation initiated by opening of switch $S_2$ is completed a predetermined interval after initiation thereof in accordance with the operation of timing circuit 198. The completion of the timing operation deenergizes coil 202.

Spring 174 acting on closing blade 148 then advances the closing blade toward and to its aperture blocking position to end the exposure interval. Initial movement of the closing blade permits $S_4$ to open according to its bias to thus open circuit 121. In its aperture blocking position, the closing blade abuts the opening blade and is biased into continuous contact therewith by spring 174.

Operation of the lamp selecting apparatus of this invention takes place in response to the thermal radiation resulting form the discharge of a photoflash lamp following the closure of switch $S_3$. Thermal radiation from the lamp heats bimetallic member 42 and causes it to deflect downward from the position shown in FIG. 1. The bimetallic member maintains its nondeflected position, shown in FIG. 1 and is deflectable only in response to thermal radiation resulting from discharge of a photoflash lamp in an assembly 18 mounted upon mounting means 34. In its nondeflected position, the bimetallic member positions regulating structure 44 in the above-described position so that first pawl 52 is interposed in the path of movement of teeth 32 wherein one tooth is engaged and retained by pawl 52 to arrest rotation of rotatable means 14, which otherwise would occur due to the action of drive spring 40. The pawls are positioned relative to the path of teeth 32 so that when bimetallic member 42 deflects, pawl 52 begins to move out of the path of teeth 32 away from tooth 32a, and pawl 54 begins to move into the path of the teeth into position for engagement with tooth 32b. When sufficient deflection has occurred, pawl 52 releases tooth 32a, drive spring 40 rotates rotatable means 14, and thereby brings tooth 32b into abutment with pawl 54. As bimetallic member 42 cools in the absence of thermal radiation from a photoflash lamp, it returns toward and to its nondeflected position. Pawl 52 moves back into the path of the teeth and thereafter pawl 54 moves out of the aforesaid path to release tooth 32b. Rotatable means 14 rotates under the influence of drive spring 40 to bring tooth 32b into abutment with pawl 52. The result of the above operation is a 90° rotation of rotating means 14 and thereby a 90° rotation of multilamp photoflash assembly 18. The previously discharged lamp is thereby directed away from the scene and advanced from electrical connection with terminals 272; a fresh lamp being directed toward the scene and advanced to a position in electrical connection with terminals 272. Successive lamp discharges cause further rotation which successively bring teeth 32c and 32d into abutment with pawl 52, thereby successively directing the remaining lamps toward the scene in electrical connection with terminals 272. When an assembly is exhausted it is removed and a fresh one is installed.

In operation, the duration of the exposure interval is of a shorter period of time than that required for thermal radiation responsive means 16 to release rotatable means 14. In this manner, a fresh bulb is not advanced in position for ignition while circuit 121 remains closed after discharge of the previous lamp. For example, in the apparatus described above, the circuit is completed when opening blade 146 moves to its aperture unblocking position and closing blade 148 is retained in its aperture unblocking position. The circuit is not opened until the closing blade is released and moves toward its aperture blocking position. Therefore, the apparatus must prevent advancement of a fresh bulb into electrical contact with terminals 272 prior to initial movement of closing blade 148 from its aperture unblocking position. To effect this, circuit 198 limits the duration of exposure intervals during photography utilizing photoflash illumination to a predetermined length; for example, 34 milliseconds. Accordingly, bimetallic member 42 is calibrated to require a longer time; for example, 55 milliseconds, to completely respond to the thermal radiation resulting from discharge of a photoflash lamp to permit sufficient rotation of rotatable means 14 to locate a subsequent lamp for electrical contact with terminals 272.

After termination of the exposure interval, lever 220 is released. Spring means 218 rotates lever 220 relative to extension 216 to open switch $S_1$ and thereafter spring means 170 advances the control element clockwise; the control element, in turn, exerts a force on the opening and closing blades which returns them to their aperture blocking and unblocking positions respectively and exerts a continuous force on the opening and closing blades for continuously urging keeper 206 into contact with core 200. During return movement of the opening and closing blades, switch $S_3$ is permitted to open according to its bias by movement of the opening blade out of engagement therewith; thereafter the opening blade returns switch $S_2$ to its closed position for returning switch $S_4$ to its closed condition.

Since human reaction time involved in operating the apparatus described above substantially exceeds the longest average exposure apt to be used under normal "snapshot" conditions of scene brightness, the contacts of switch $S_1$ will be closed for at least as long as the correct exposure time.

It should be understood that the terms "up," "down," "clockwise" and "counterclockwise" and the like are used in the foregoing disclosure to describe movement of various elements as seen in the figures and are not intended to be used in a limiting sense.

Since certain changes may be made in the above apparatus without departing from the scope of the invention herein involved, it is intended that all matter contained in the above description or shown in the accompanying drawings shall be interpreted as illustrative and not in a limiting sense.

I claim:

1. Photographic apparatus electrically connectable to a photoflash lamp ignition circuit, said apparatus comprising:
   a. means movably supporting a multilamp photoflash assembly for directing each lamp of said assembly toward a scene to be photographed one at a time in succession, said lamps being connected in said circuit for ignition when directed toward said scene;
   b. means for movably biasing said supporting means; and
   c. thermal radiation responsive means for restraining movement of said supporting means and for releasing said supporting means for movement in response to ignition of the lamp directed toward said scene to thereby permit another lamp to be directed toward said scene for subsequent ignition.

2. Apparatus according to claim 1 wherein said thermal radiation responsive means comprises a bimetallic element positioned adjacent the lamp directed toward said scene in the path of thermal radiation resulting from ignition thereof.

3. Photographic apparatus for locating the individual lamps of a packaged multilamp flash assembly in an operative ignitable position comprising:
   means for rotatably supporting said rotatably supporting multilamp assembly;
   drive means for urging said multilamp assembly to rotate to locate successive ones of said lamps in said operative position for ignition; and
   means reactive to thermal radiation from the said ignition of one of said lamps for causing said drive means to rotate said multilamp assembly to locate a next succeeding one of said lamps in said operative position.

4. Photographic apparatus according to claim 3 wherein said drive means comprises:
   spring means for biasing said multilamp assembly to cause said rotation of said multilamp assembly; and
   regulating means, actuable to release said multilamp assembly for rotation when a lamp therewithin is moved in said operative position and is ignited, and actuable to selectively interrupt the said rotation of said multilamp assembly when a said lamp therewithin is moved into said operative position.

5. Photographic apparatus according to claim 3 wherein said means reactive to thermal radiation from the ignition of one of said lamps is a bimetallic element.

6. Apparatus according to claim 5 wherein said bimetallic element is positioned adjacent a lamp directed toward a scene to be photographed in the path of thermal radiation resulting from ignition thereof.

7. Photographic apparatus according to claim 3 wherein said drive means comprises:
   spring means for biasing said multilamp assembly to cause said rotation; and
   regulating means for locating successive ones of said lamps of said assembly at said operative position.

8. Photographic apparatus according to claim 7 wherein said regulating means is actuable to release said multilamp assembly for rotation when a lamp therewithin is in said operative position and is ignited.

9. Photographic apparatus according to claim 8 wherein said spring means is configured to be manually loaded prior to said lamp ignition.

10. Photographic apparatus according to claim 8 wherein said means reactive to thermal radiation is movable in one direction in response to said thermal radiation, and subsequently, is oppositely movable for causing said actuation of said regulating means.

11. Photographic apparatus according to claim 10 wherein said one movement of said means reactive to thermal radiation causes said regulating means to effect partial rotation of said multilamp assembly and, said subsequent opposite movement of said thermal reactive means causes said regulating means to effect complemental rotation of said multilamp assembly into said operative position.

12. Photographic apparatus according to claim 7 wherein said thermal reactive means is configured to actuate said regulating means when responding to said thermal radiation.

13. Photographic apparatus according to claim 7 wherein said regulating means is operable to allow rotation of said multilamp assembly and selectively interrupts the said rotation of said multilamp assembly when a said lamp therewithin is moved into said operative position.

14. Photographic apparatus according to claim 7 wherein said spring means is a coiled spring placed around the axis of rotation of said means for rotatably supporting said multilamp assembly.

UNITED STATES PATENT OFFICE
CERTIFICATE OF CORRECTION

Patent No. 3,583,301      Dated June 8, 1971

Inventor(s) Richard R. Wareham

It is certified that error appears in the above-identified patent and that said Letters Patent are hereby corrected as shown below:

Col. 6, line 50, delete "rotatably supporting". (2nd occur.)
(appl.-Amendment dated July 13, 1970, claim 5)

Col. 1, line 41, delete "detachable" and insert --detachably--
(appl page 2, line 19)

Col. 2, line 33, delete "and"; second occurrence.
(appl page 4, line 14)

Col. 3, line 3, after "while" insert --biasing the capping blade for clockwise rotation, thus--
(appl. page 5, line 26-27)

Col. 3, line 34 after "the" and before "electromagnet" insert --electromechanical holding device may involve an--
(appl. page 6, line 28)

Col. 6, line 9 after "closed" and before "position" insert --condition and finally the closing blade moves to a--
(appl. page 13, line 15)

Signed and sealed this 25th day of April 1972.

(SEAL)
Attest:

EDWARD M. FLETCHER, JR.      ROBERT GOTTSCHALK
Attesting Officer      Commissioner of Patents